(12) United States Patent
Ireland et al.

(10) Patent No.: US 8,062,018 B2
(45) Date of Patent: Nov. 22, 2011

(54) BARRIER GUARD FOR DOUGH SHEETER

(75) Inventors: Zack Ireland, Pittsburgh, PA (US);
James Mullen, Sharpsburg, PA (US);
Ralph Ronald Flory, Allison Park, PA (US); Thomas Robert Ladley, South Park, PA (US); Craig Todd Falk, Derry, PA (US)

(73) Assignee: Phoenix Intangibles Holding Company, Greenville, DE (US)

( * ) Notice: Subject to any disclaimer, the term of this patent is extended or adjusted under 35 U.S.C. 154(b) by 269 days.

(21) Appl. No.: 12/509,747

(22) Filed: Jul. 27, 2009

(65) Prior Publication Data
US 2011/0020484 A1    Jan. 27, 2011

(51) Int. Cl.
*A21C 3/02* (2006.01)
(52) U.S. Cl. ........................ 425/151; 425/472
(58) Field of Classification Search .................. 425/136, 425/151, 472
See application file for complete search history.

(56) References Cited

U.S. PATENT DOCUMENTS

| 1,291,468 | A | * | 1/1919 | Frand ............................ 425/151 |
| 4,255,106 | A | | 3/1981 | Anetsberger et al. |
| 4,976,600 | A | * | 12/1990 | Willett ........................... 425/151 |
| 5,674,543 | A | | 10/1997 | Partida |
| 5,811,137 | A | | 9/1998 | Clark et al. |

OTHER PUBLICATIONS

ACME 8 & 88 Rol-Sheeter, www.acmepbe.com/pdfs/8-88_spec.pdf, 2 pp., 2003.

* cited by examiner

*Primary Examiner* — James Mackey
(74) *Attorney, Agent, or Firm* — David V. Radack, Esquire; Stephen A. Bucchianeri, Esquire; Eckert Seamans Cherin & Mellott, LLC

(57) ABSTRACT

A guard member for use with a dough sheeter having a shut-off mechanism includes a first portion structured to be coupled at or near a dough feed opening of the dough sheeter and a second portion coupled to the first portion. The second portion having a front face and an opposite rear face, the rear face being structured to engage and activate the shut-off mechanism when contact is made with the front face by an outside force.

17 Claims, 6 Drawing Sheets

BARRIER GUARD FOR DOUGH SHEETER

FIELD OF THE INVENTION

This invention generally relates to dough sheeter apparatus and, more particularly, to a guard member for use on a dough sheeter apparatus.

BACKGROUND OF THE INVENTION

Dough sheeters for many specific products have been provided including both batch and continuous strip forming devices having automatic and manual feeds. With manual feed devices, caution and great care must be exercised by the operator to avoid injury, particularly the catching and crushing of fingers and hands by and between cooperating dough rollers. This is especially true in the case of dough sheeters being used by relatively young and/or inexperienced operators with the highest incidence of carelessness and inattention.

FIGS. 1 and 2 illustrate an example of a dough sheeter apparatus 10 (hereinafter "dough sheeter") with an added dough rolling attachment 12. Such example dough sheeter 10 is known as a Rol-Sheeter model manufactured by Acme Pizza and Bakery Equipment of Commerce, Calif. Dough sheeter 10 includes a housing 14 having an inlet 16 into which an operator would insert a generally thick piece of dough (not shown) for processing. Once inside the dough sheeter 10, the inserted dough passes between a number of adjustable rollers (not shown) in a manner that flattens the dough into a thin piece of dough having a generally uniform desired thickness. After passing through the internal rollers, the dough exits the housing 14 via outlet 18 where the flattened dough is disposed on conveyor 20. In the example Rol-Sheeter shown in FIGS. 1 and 2, the flattened dough then passes under the rolling attachment 12 which causes the flattened dough to be rolled into a generally cylindrical shape, such as for use in making a loaf of bread.

As shown in greater detail in FIG. 2, the dough sheeter 10 further includes a safety bar 22 disposed generally across inlet 16 and a central guard member 23 extending generally downward and outward in the inlet 16 above the safety bar 22. Safety bar 22 includes a first end 24 that is generally movably coupled to the housing 14 and an opposite second end 26 that extends through a slot 28 in the housing 14 and is coupled to a shut-off mechanism 30. Safety bar 22 and central guard member 23 are thus arranged in a manner such that if an operator were to attempt to place a hand into the inlet 16 while the dough sheeter 10 was powered on, thus risking possible injury due to the internal moving parts, such attempt would tend to raise the safety bar 22 and thus activate the shut-off mechanism 30, shutting off the dough sheeter 10. However, such actuation of the shut-off mechanism 30 would only occur when an operator attempted to reach under the safety bar 22, thus causing it to move upward. In an instance where the operator reaches over the safety bar 22, for instance attempting to reach around central guard member 23 instead of under, the safety bar would not be moved upward, and thus the shut-off mechanism would not be activated. Such instances commonly lead to injury to the operator.

Accordingly, there exists a need in the art for improved safety equipment for use with dough sheeters, particularly improved safety equipment that may be readily applied to existing units.

SUMMARY OF THE INVENTION

Certain objects of the invention are achieved by providing a guard member for use with a dough sheeter having a shut-off mechanism. The guard member comprising a first portion structured to be coupled at or near a dough feed opening of the dough sheeter and a second portion coupled to the first portion. The second portion having a front face and an opposite rear face. The rear face being structured to engage and activate the shut-off mechanism when contact is made with the front face by an outside force.

The first portion may comprise a generally planar member, and the second portion may comprise a first planar section coplanar with the planar member and a second planar section positioned generally 90° to the first planar section.

The first portion may comprise a first part of a unitary piece of material and the second portion may comprise a second part of the unitary piece of material. The unitary piece of material may be formed from stainless steel.

The first portion may comprise a first member, and the second portion may comprise a second member hingedly coupled to the first member by a number of hinge members. Each of the number of hinge members may comprise a spring member disposed in a manner which biases the second member with respect to the first member.

The first member may be a generally planar member, and the second member may comprise a first planar portion disposed at an angle to the first member and a second planar portion positioned generally 90° to the first member.

The first portion may comprise a number of apertures, each of the number of apertures being structured to engage a corresponding threaded stud of the dough sheeter for coupling the guard member to the dough sheeter.

The guard member may be structured to cover a substantial portion of the inlet.

Further objects of the invention are achieved by providing a dough sheeter for processing pieces of dough. The dough sheeter comprising a housing having a dough feed opening structured to receive the pieces of dough, a shut-off mechanism disposed at the dough feed opening, the shut-off mechanism structured to terminate operation of the dough sheeter when activated, and a guard member. the guard member comprising a first portion coupled to the housing at or near the dough feed opening, and a second portion movable with respect to the first portion. The second portion having a front face and an opposite rear face. The rear face engaging and activating the shut-off mechanism when displaced with respect to the first portion.

The shut-off mechanism may be displaced in a vertical direction by the second portion when the shut-off mechanism is engaged and activated.

The housing may comprise a number of studs and the first portion may comprise a number of apertures, wherein each of the number of apertures engages a respective one of the number of studs.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF THE PREFERRED EMBODIMENTS

Figure 1:
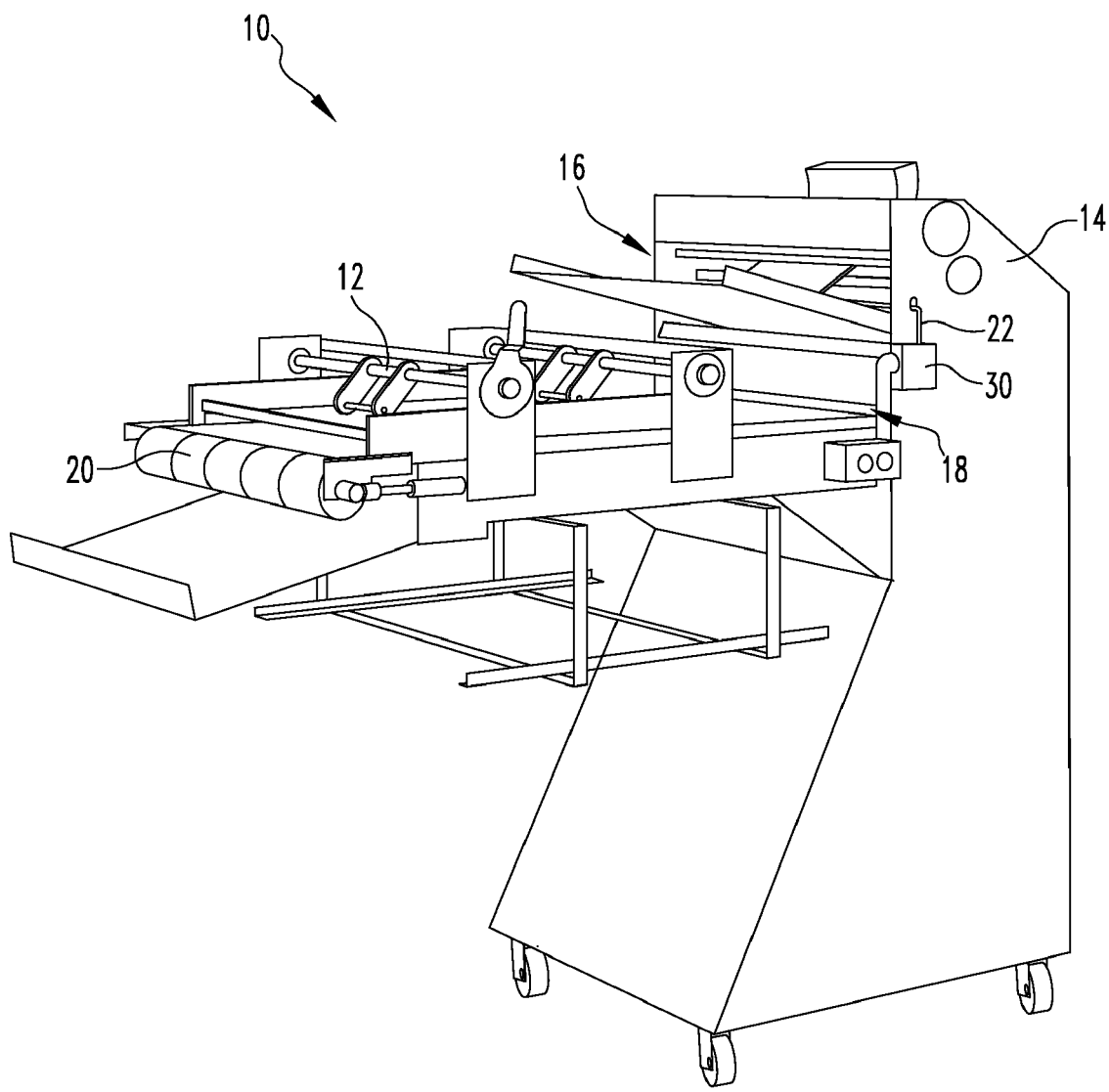
FIG. 1 is an isometric view of a known dough sheeter mechanism.
Figure 2:
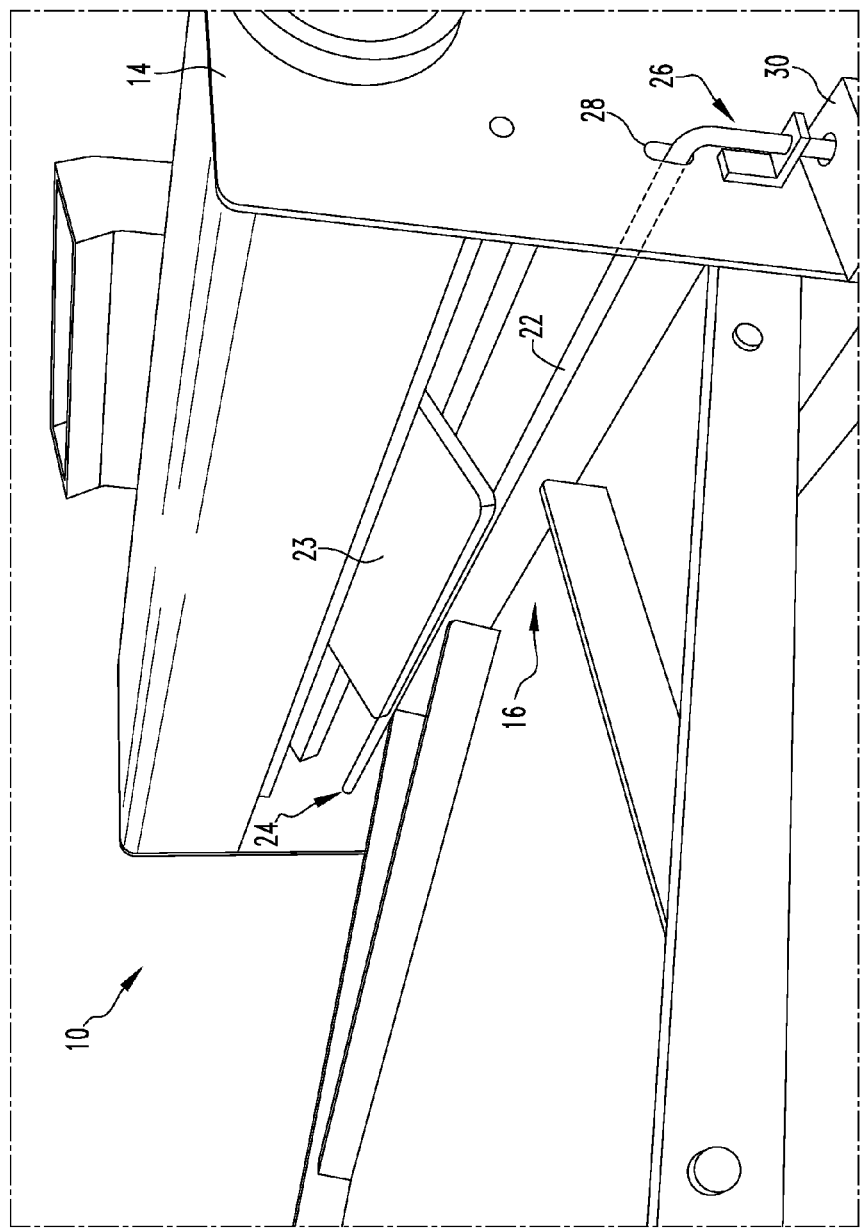
FIG. 2 is an isometric view of a portion of the dough sheeter mechanism of FIG. 1.

For purposes of the description hereinafter, the terms "upper", "lower", "vertical", "horizontal", "axial", "top", "bottom", "aft", "behind", and derivatives thereof shall relate to the invention as it is oriented in the drawing FIGS. or as it is oriented when resting upright on a flat horizontal surface. It is also to be understood that the specific elements illustrated in the FIGS. and described in the following specification are simply example embodiments of the invention. Therefore, specific dimensions, orientations and other physical characteristics related to the embodiments disclosed herein are not to be considered limiting.

As employed herein, the term "number" shall mean one or an integer greater than one (i.e., a plurality). As employed herein, the statement that two or more parts are "attached", "connected", "coupled", or "engaged" together shall mean that the parts are joined together either directly or joined through one or more intermediate parts.

Figure 3:
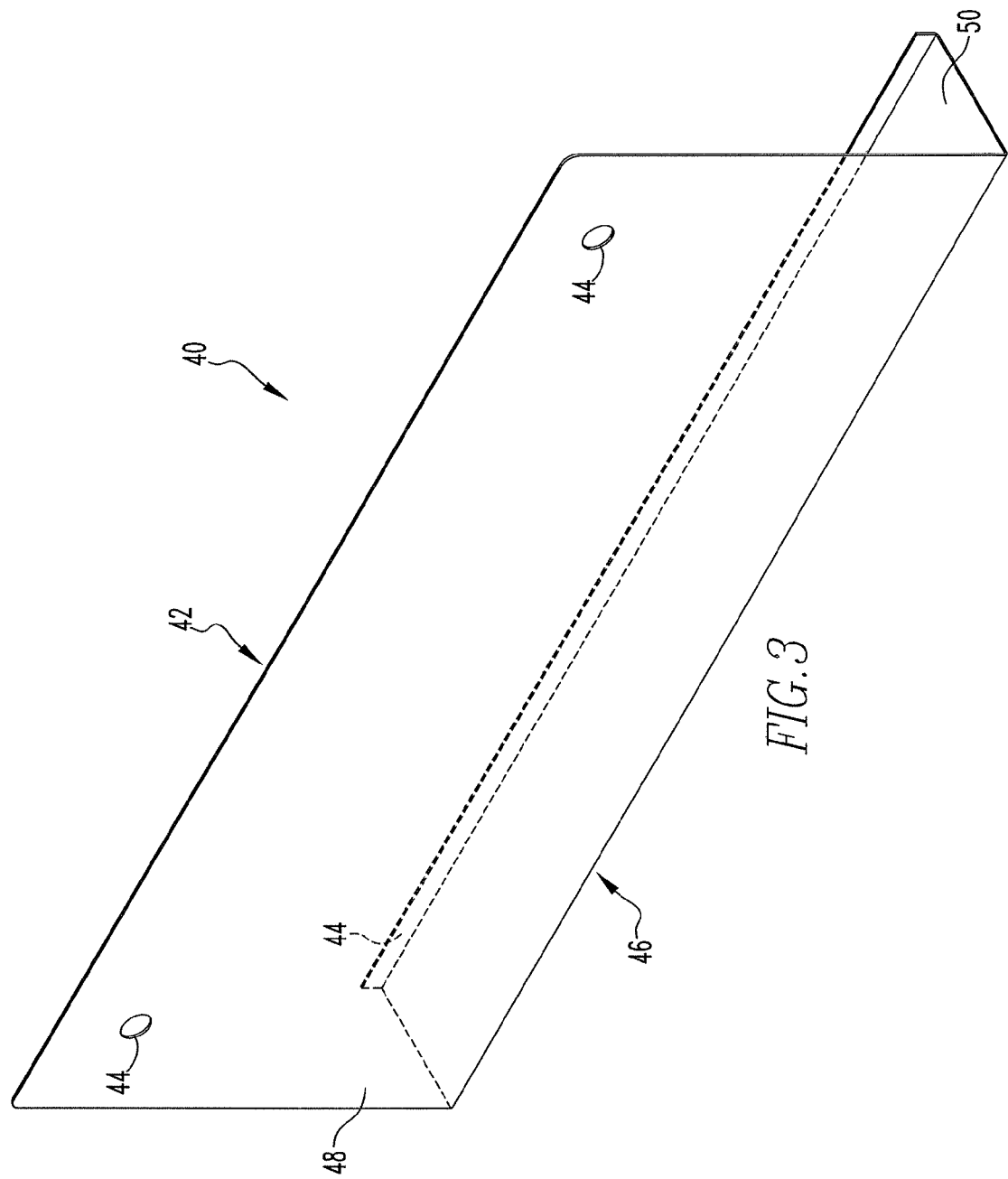
FIG. 3 is an isometric view of a guard member according to an embodiment of the invention.

An example guard member 40 in accordance with an embodiment of the invention is depicted in FIG. 3. Guard member 40 includes a first portion 42, of generally planar shape, having a number of apertures 44 disposed therein for securing the first portion 42, and thus guard member 40, to the housing 14, as will be discussed further below. Guard member 40 further includes a second portion 46 having a number of generally planar sections, including a first section 48 coplanar with first portion 42 and a transverse section 50 positioned generally 90° to section 48. Preferably, guard member 40 is formed from a single sheet of stainless steel material, as depicted in the embodiment of FIG. 3, however other types and quantities of material may also be employed without varying from the scope of the present invention.

Figure 4:
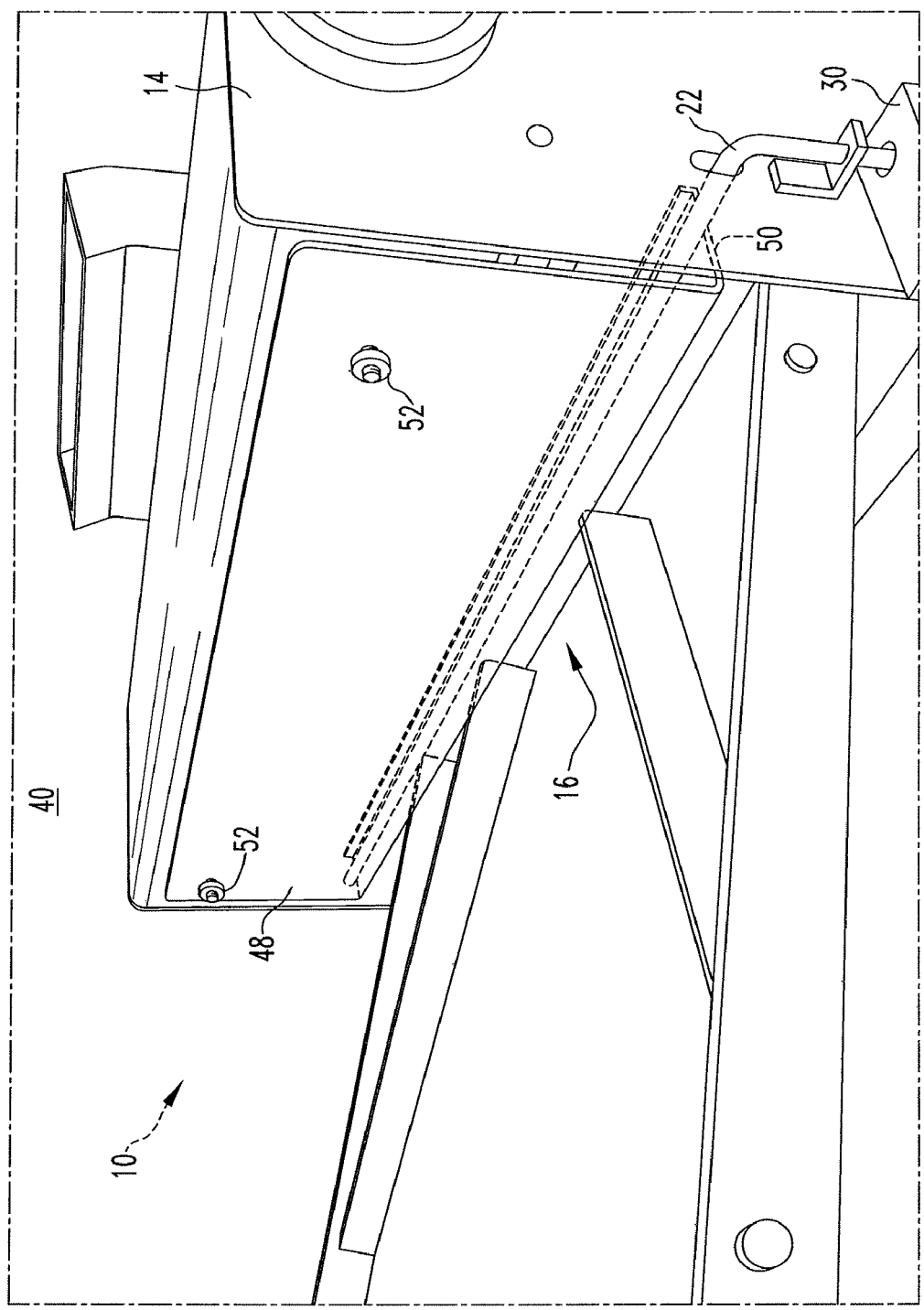
FIG. 4 is an isometric view of the guard member of FIG. 3 installed on the dough sheeter mechanism of FIG. 1.

FIG. 4 shows the guard member 40 installed on the previously described dough sheeter 10. In the preferred embodiment shown, the first portion 42 of guard member 40 is rigidly coupled to the dough sheeter 10 via threaded studs (not numbered) which extend from the housing 14 and pass through each of the apertures 44 of the guard member 40. Threaded retention members 52 retain the guard member 40 on the threaded studs. The construction of guard member 40 along with such coupling arrangement allows for the second portion 46 of the guard member 40 to move relative to the first portion 42 through flexure of the material. Such coupling arrangement also provides for the guard member 40 to be readily aligned with the inlet 16 and easily installed by a single person. It is to be appreciated that other coupling members (e.g., without limitation, threaded insert & cooperating bolt) may also be employed without varying from the scope of the present invention.

When installed on the dough sheeter 10, the upper side (not numbered) of transverse section 50 generally abuts, or is positioned in close proximity to, the underside of safety bar 22, as generally shown in hidden line drawing in FIG. 4. A notched portion (not shown) may be provided in transverse section 50 at or near the first end 24 of safety bar 22 to aid in the fitting and installation of guard member 40 to the dough sheeter 10. Such positioning of the guard member 40 provides for the safety bar 22 to be raised, and thus shut-off mechanism 30 activated, when contact with the first section 48 of second portion 46 of guard member 40 is made, such as by an operator attempting to place an inappropriate object (i.e., something other than a piece of dough) into the inlet 16. Such activation of shut-off mechanism 30 is provided due to the flexure of guard member 40, particularly the relative movement of the second portion 46 relative to first portion 42.

As FIG. 4 plainly shows, guard member 40 generally covers a substantial portion of, and thus prevents any access to inlet 16 that could have readily occurred in the known dough sheeter 10 (as previously discussed) while still providing for complete functionality of the existing safety-bar 22 and shut-off mechanism 30.

Figure 5:
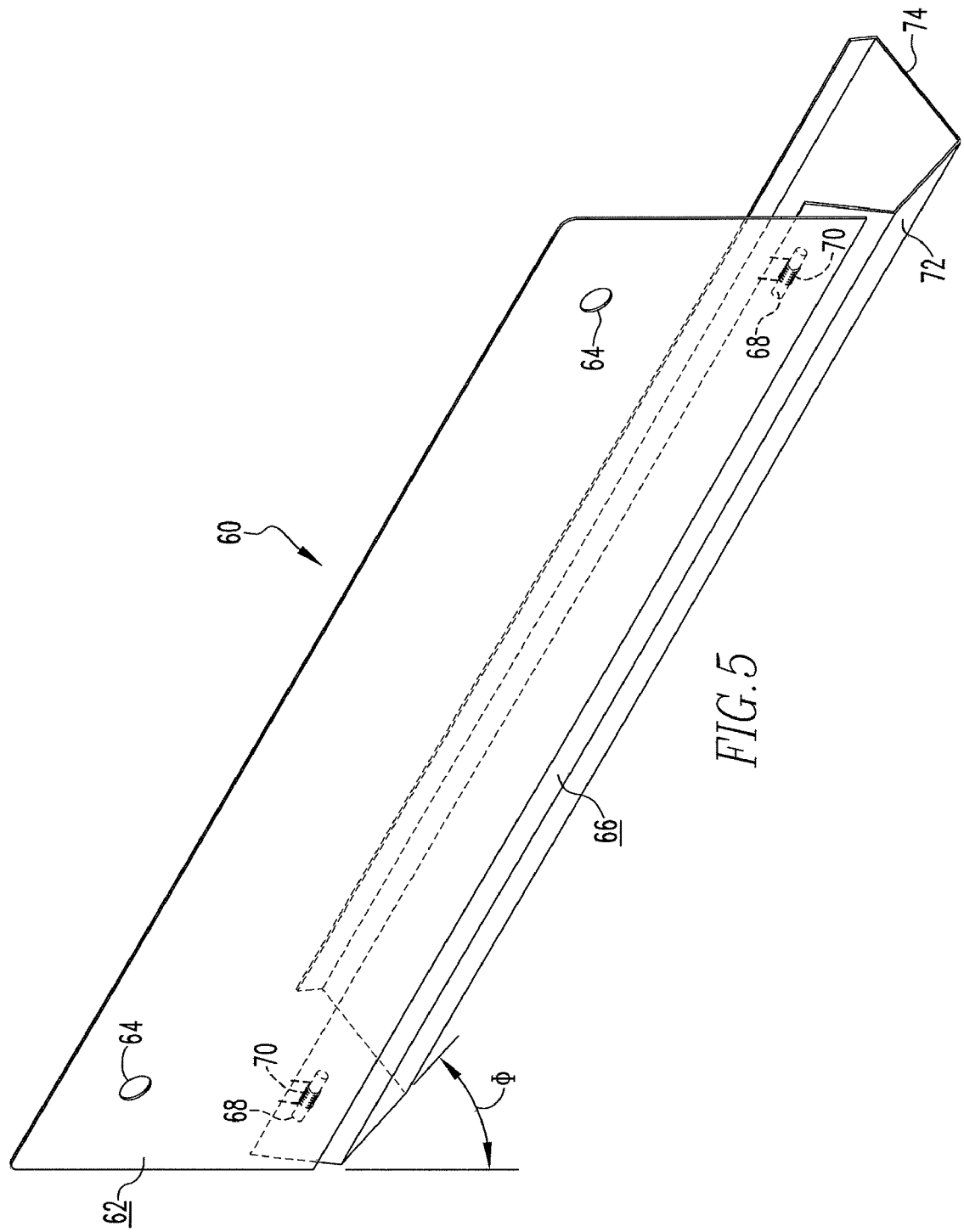
FIG. 5 is an isometric view of a guard member according to another embodiment of the invention.

FIG. 5 shows an example of a guard member 60 according to another embodiment of the invention. Guard member 60 includes a first portion, first member 62, of generally planar shape, having a number of apertures 64 disposed therein for securing the first member 62, and thus guard member 60, to the housing 14, as will be discussed further below. Guard member 60 further includes a second portion, second member 66, hingedly coupled to first member 62 by a number of hinge members 68. In the preferred embodiment shown in FIGS. 5 and 6, each hinge member 68 includes a spring member 70 that provides a bias between the second member 66 and the first member 62, which will be discussed in further detail below.

Second member 66 includes a number of generally planar sections, including a first planar portion 72 disposed at an angle φ to the first member 62, and a second planar portion 74, positioned generally 90° to the first member 62. Preferably, the first planar portion is disposed at angle of about 30°-60°, providing an increased effective opening to inlet 16 as compared to the embodiment shown in, and described in regard to, FIGS. 3 and 4.

Figure 6:
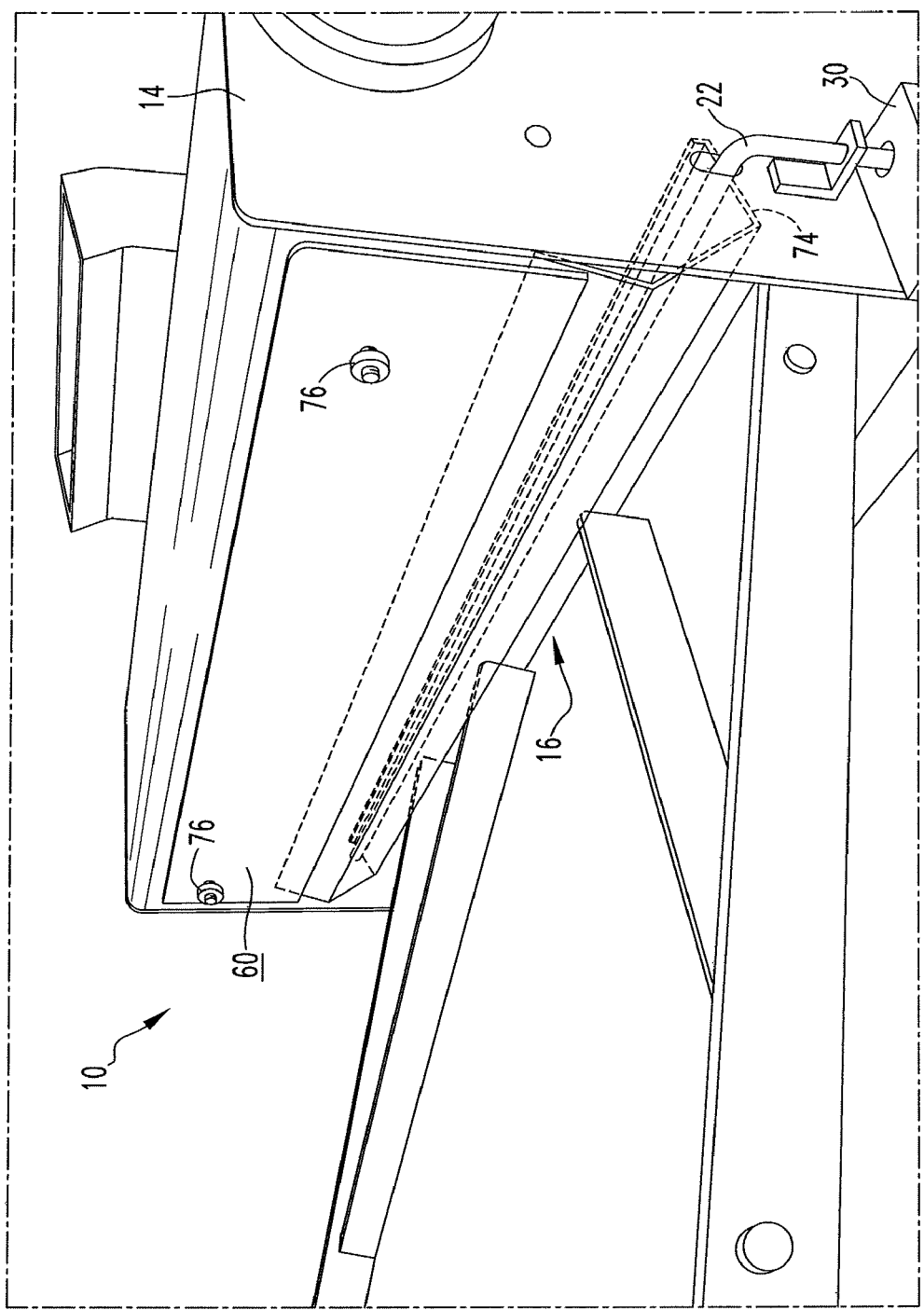
FIG. 6 is an isometric view of the guard member of FIG. 5 installed on the dough sheeter of FIG. 1.

FIG. 6 shows the guard member 60 installed on the previously described dough sheeter 10. In the preferred embodiment shown, the first member 62 of guard member 60 is rigidly coupled to the dough sheeter 10 via threaded studs (not numbered) which extend from the housing 14 and pass through each of the apertures 64 of the guard member 60. Threaded retention members 76 retain the guard member 60 on the threaded studs. The use of threaded studs allows for the guard member 60 to be readily aligned with the inlet 16 and easily installed by a single person. It is to be appreciated that other coupling members (e.g., without limitation, threaded insert & cooperating bolt) may also be employed without varying from the scope of the present invention.

When installed on the dough sheeter 10, the upper side (not numbered) of second planar portion 74 generally abuts, or is positioned in close proximity to, the underside of safety bar 22, as generally shown in partial hidden line drawing in FIG. 6. Second planar portion 74 may further include a notched portion (not shown) at or near the first end 24 of safety bar 22 to aid in the fitting and installation of guard member 60 to the dough sheeter 10. Such positioning of guard member 60 provides for the safety bar 22 to be raised, and thus shut-off mechanism 30 activated, when contact with the second member 66 of guard member 60 is made, such as by an operator attempting to place an inappropriate object (i.e., something other than a piece of dough) into the inlet 16. Such activation of shut-off mechanism 30 is provided due to the movement of second member 66 relative to the first member 62 through movement of each of the number of hinge members 68. In the preferred embodiment shown, each of the spring members 70 bias the second member 66 in a direction generally away from the inlet 16, in a manner that tends to resist activation of the shut-off mechanism 30. Accordingly, it is to be readily appreciated that the relative sensitivity of the shut-off mechanism may be adjusted by changing the size, and thus the biasing force, of each of the spring members 70.

As FIG. 6 plainly shows, guard member 60 generally covers a substantial portion of, and thus prevents any access to inlet 16 that could have readily occurred in the known dough sheeter 10 (as previously discussed) while still providing for complete functionality of the existing safety-bar 22 and shut-off mechanism 30.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended hereto and any and all equivalents thereto.

What is claimed is:

1. A guard member for use with a dough sheeter having a shut-off mechanism, said guard member comprising:
   a first portion structured to be coupled at or near a dough feed opening of the dough sheeter; and
   a second portion coupled to the first portion, the second portion having a front face and an opposite rear face, the rear face being structured to engage and activate the shut-off mechanism when contact is made with the front face by an outside force.

2. The guard member of claim 1 wherein the first portion comprises a generally planar member; and the second portion comprises a first planar section coplanar with the planar member and a second planar section positioned generally 90° to the first planar section.

3. The guard member of claim 2 wherein the first portion comprises a first part of a unitary piece of material and the second portion comprises a second part of the unitary piece of material.

4. The guard member of claim 3 wherein the unitary piece of material is formed from stainless steel.

5. The guard member of claim 1 wherein the first portion comprises a first member, and the second portion comprises a second member hingedly coupled to the first member by a number of hinge members.

6. The guard member of claim 5 wherein each of the number of hinge members comprises a spring member disposed in a manner which biases the second member with respect to the first member.

7. The guard member of claim 5 wherein the first member is a generally planar member; and the second member comprises a first planar portion disposed at an angle to the first member and a second planar portion positioned generally 90° to the first member.

8. The guard member of claim 1 wherein the first portion comprises a number of apertures, each of the number of apertures being structured to engage a corresponding threaded stud of the dough sheeter for coupling the guard member to the dough sheeter.

9. A dough sheeter for processing pieces of dough, the dough sheeter comprising:
   a housing having a dough feed opening structured to receive the pieces of dough;
   a shut-off mechanism disposed at the dough feed opening, the shut-off mechanism structured to terminate operation of the dough sheeter when activated; and
   a guard member comprising:
      a first portion coupled to the housing at or near the dough feed opening; and
      a second portion movable with respect to the first portion, the second portion having a front face and an opposite rear face, the rear face engaging and activating the shut-off mechanism when displaced with respect to the first portion.

10. The dough sheeter of claim 9 wherein the first portion of the guard member comprises a generally planar member; and the second portion of the guard member comprises a first planar section coplanar with the planar member and a second planar section positioned generally 90° to the first planar section.

11. The dough sheeter of claim 10 wherein the first portion comprises a first part of a unitary piece of material and wherein the second portion comprises a second part of the unitary piece of material.

12. The dough sheeter of claim 11 wherein the unitary piece of material is formed from stainless steel.

13. The dough sheeter of claim 9 wherein the first portion comprises a first member, and the second portion comprises a second member hingedly coupled to the first member by a number of hinge members.

14. The dough sheeter of claim 13 wherein each of the number of hinge members comprises a spring member disposed in a manner which biases the second member with respect to the first member.

15. The dough sheeter of claim 13 wherein the first member is a generally planar member; and the second member comprises a first planar portion disposed at an angle to the first member and a second planar portion positioned generally 90° to the first member.

16. The dough sheeter of claim 9 wherein the shut-off mechanism is displaced in a vertical direction by the second portion when the shut-off mechanism is engaged and activated.

17. The dough sheeter of claim 9 wherein:
   the housing comprises a number of studs; and
   the first portion comprises a number of apertures, wherein each of the number of apertures engages a respective one of the number of studs.

* * * * *